Nov. 22, 1949  F. H. McGUIGAN  2,489,192
ROTATING SPRINKLER FOR LAWNS
Filed July 15, 1947

INVENTOR.
F. H. McGuigan
BY James Atkins
Attorney.

Patented Nov. 22, 1949

2,489,192

UNITED STATES PATENT OFFICE 2,489,192

ROTATING SPRINKLER FOR LAWNS

Francis H. McGuigan, Midland, Tex.

Application July 15, 1947, Serial No. 760,971

5 Claims. (Cl. 299—63)

This invention relates to a sprinkler, and is more particularly concerned with a lawn sprayer or sprinkler of the character wherein a liquid fertilizer, insecticide or other chemical is sprayed over a lawn in admixture with a spray of water delivered through a hose or similar conduit.

A primary object of the invention is to provide a lawn sprayer wherein a liquid fertilizer or chemical is fed by gravity into a depression in the top of a rotary spray head, and the spray head is provided externally thereof with helically arranged ribs partially overhanging perforations through which jets of water from a hose or the like are directed for rotating the head, the head being formed to provide for outward movement of the liquid fertilizer by centrifugal action and in admixture with the water from the jets, whereby a relatively large fertilizer-bearing spray is directed laterally of the axis of the rotary spray head.

A further object of the invention is the provision of a lawn sprayer of this type which, while being relatively simple in construction, is highly efficient in operation.

Other objects and advantages of the invention will become apparent in the course of the following detailed description, taken in connection with the accompanying drawing, wherein.

Figure 1:
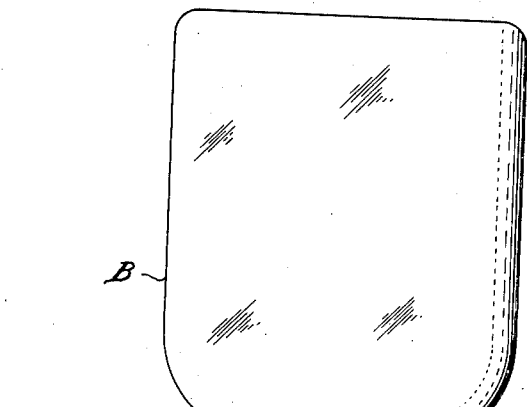
Figure 1 is a side elevational view of the improved sprinkler or sprayer in accordance with a preferred structural embodiment thereof.
Figure 2:
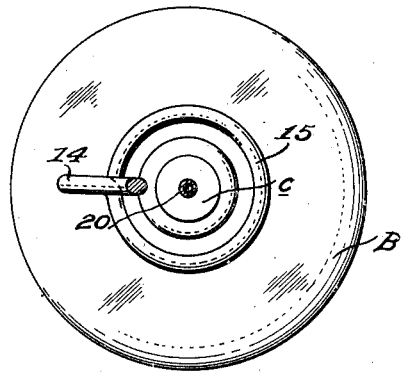
Figure 2 is a horizontal sectional view as observed in the plane of line 2—2 on Figure 1.
Figure 3:
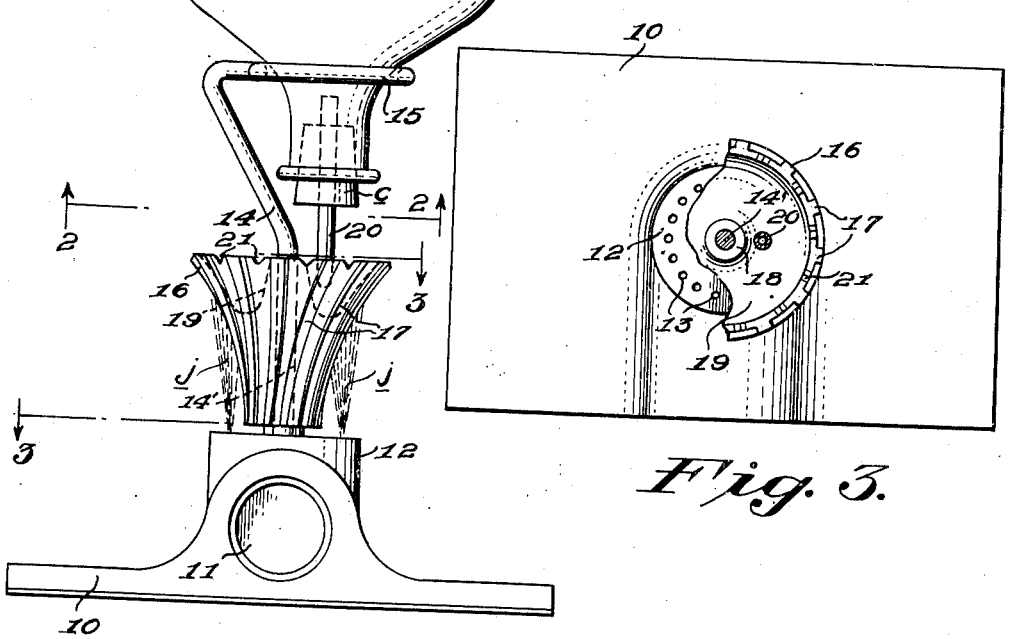
Figure 3 is a horizontal sectional view as observed in the planes of the broken line 3—3 on Figure 1.

Referring now in detail to the drawing, the improved sprinkler comprises a base 10 which is of substantial horizontal area and which is adapted for resting on the ground in different selected locations in the use of the sprinkler.

The base 10 is provided with a hose connection 11 which provides an inlet to an otherwise closed chamber 12.

The chamber 12 includes a cylindrical side wall and a plane circular top wall which is provided with a circular series of perforations 13.

A rod 14 includes a lower vertically disposed straight portion 14' whose terminal is suitably secured to the top wall of chamber 12, which portion provides a pivotal axis for a rotary spray head 16, the axis being concentric with the circular series of perforations 13.

The rod 14 is bent laterally of said axis above the spray head and is then provided with a horizontally disposed circular bottle-supporting ring 15.

The spray head 16 is of generally inverted frusto-conical form with the side wall thereof curving inwardly toward its axis of rotation, and the upper and larger end of the head overhangs the perforations 13, as is clearly indicated in Figure 1.

The head 16 is provided with helically disposed ribs or vanes 17 for rotation of the head by impingement of jets of water j against the edge walls thereof, which jets issue from the perforations 13, as is indicated in Figure 1.

The head 16 includes an inner hub portion 18 at the upper end thereof, and a relatively deep depression 19 is provided in the upper end of the head in surrounding relation to the hub 18.

The liquid fertilizer or chemical is contained within a bottle B which, in use, is inverted and is supported adjacent its head in the ring 15, as is indicated in Figure 1.

A fertilizer-delivery nozzle 20 extends through the cork c in the bottle B into communication with the interior of the bottle, and the outer end of the nozzle is disposed within the depression 19. The upper edge of the side wall of the head 16 is provided with radial grooves 21 intermediate the ribs 17 for a purpose later to appear.

In the use and operation of the improved sprinkler as above described, the base 10 is placed at any desired point on a lawn and a hose connected with the inlet 11 of the chamber 12.

The bottle B containing the liquid fertilizer or chemical is then placed in inverted position and supported by the ring 15, with the lower end of nozzle 20 disposed within the depression 19. The water is then turned on with resulting pressure jets j acting on the spiral ribs 17, thereby effecting rotation of the spray head 16.

The liquid fertilizer or chemical will be fed by gravity into the depression 19 and will be expelled through the grooves 21 by centrifugal force. The water from jets j will travel upwardly between the ribs 17 and, due to the outer flare of the head, such water will admix with the liquid fertilizer, whereby a substantially horizontal sheet spray will result.

After spraying any one area, the device may readily be transported for spraying an adjacent area.

It is to be particularly observed that the improved device is relatively simple in construction, durable, and at the same time highly effective in operation.

While I have disclosed my invention in accordance with a single specific embodiment thereof, such is to be considered as illustrative only, and not restrictive, the scope of the invention being defined in the following claims.

What I claim and desire to secure by U. S. Letters Patent is:

1. A fertilizing lawn sprayer comprising a base having a water chamber associated therewith and a hose connection communicating with the chamber, said chamber having a horizontal top wall, a rod including a vertical portion secured in said top wall, an elongated head rotatably supported above said chamber on said vertical portion of the rod, a circular series of perforations in the upper wall of said chamber in surrounding relation to said rod portion for formation of vertical water jets therefrom, said head having an upwardly diverging outer wall concentric with said vertical rod portion and provided with spirally disposed ribs for rotation of the head by impingement of the jets on the ribs, a depression in the upper end of the head in surrounding relation to said rod portion, and means supported by said rod for delivering liquid fertilizer by gravity into said depression.

2. The structure according to claim 1, wherein a ring is provided on the upper end of said rod, and wherein said means comprises a liquid fertilizer container removably seated in said ring, and a liquid-delivering nozzle extending from the container and communicating with said depression.

3. The structure of claim 1, wherein the upper edge of said outer wall surrounding said depression is provided with radially disposed grooves between said ribs.

4. A fertilizing lawn sprayer comprising a base having a water chamber for connection with a hose and having an upper horizontal wall, a rod having one end thereof secured to the upper wall of said chamber, a portion of said rod being vertically disposed, a head rotatably supported on said vertically disposed rod portion, said head being of generally frusto-conical form with the larger end thereof uppermost, spirally disposed ribs on the outer wall of said head, perforations in said upper wall of said chamber within a projected circumference of the upper end of the head, whereby water jets are formed and upon impingement on said ribs rotate the head, the upper portion of said rod being laterally deflected and terminating in a ring for supporting an inverted liquid fertilizer-containing bottle in inverted position, a depression in the upper end of said head in surrounding relation to said vertically disposed rod portion, and a liquid delivering nozzle communicating with the interior of said bottle and with said depression.

5. The structure according to claim 3, wherein said head at the upper end thereof is provided with radially disposed grooves between said ribs and between said outer wall and said depression.

FRANCIS H. McGUIGAN.

REFERENCES CITED

The following references are of record in the file of this patent:

UNITED STATES PATENTS

| Number | Name | Date |
|---|---|---|
| 1,096,143 | Williams | May 12, 1914 |
| 1,307,514 | Patterson | June 24, 1919 |
| 1,753,019 | Page | Apr. 1, 1930 |
| 1,831,540 | Nelson | Nov. 10, 1931 |
| 2,177,053 | Boyd | Oct. 24, 1939 |
| 2,220,275 | Preston | Nov. 5, 1940 |
| 2,426,291 | Abrams | Aug. 26, 1947 |

FOREIGN PATENTS

| Number | Country | Date |
|---|---|---|
| 633,208 | France | Oct. 22, 1927 |